(12) United States Patent
White

(10) Patent No.: US 11,628,411 B1
(45) Date of Patent: Apr. 18, 2023

(54) SYSTEM, METHOD, AND APPARATUS TO OXYGENATE WATER

(71) Applicant: Terry M. White, Accokeek, MD (US)

(72) Inventor: Terry M. White, Accokeek, MD (US)

( * ) Notice: Subject to any disclaimer, the term of this patent is extended or adjusted under 35 U.S.C. 154(b) by 0 days.

(21) Appl. No.: 17/648,049

(22) Filed: Jan. 14, 2022

Related U.S. Application Data

(63) Continuation of application No. 17/247,578, filed on Dec. 17, 2020, now Pat. No. 11,224,845.

(60) Provisional application No. 62/965,335, filed on Jan. 24, 2020.

(51) Int. Cl.
  *B01F 3/04* (2006.01)
  *B01F 25/313* (2022.01)
  *C02F 7/00* (2006.01)
  *B01F 23/232* (2022.01)
  *B01F 23/237* (2022.01)
  *B01F 25/00* (2022.01)
  *B01F 101/00* (2022.01)
  *B01F 101/35* (2022.01)

(52) U.S. Cl.
  CPC .......... *B01F 25/3131* (2022.01); *B01F 23/232312* (2022.01); *C02F 7/00* (2013.01); *B01F 23/237612* (2022.01); *B01F 2025/911* (2022.01); *B01F 2025/916* (2022.01); *B01F 2025/9191* (2022.01); *B01F 2101/305* (2022.01); *B01F 2101/35* (2022.01)

(58) Field of Classification Search
  CPC ........ B01F 2025/9191; B01F 2025/916; B01F 2101/35; B01F 2101/305; B01F 23/232312; B01F 23/237611; B01F 23/237612; B01F 25/3131; B01F 2025/911; C02F 7/00

USPC .............. 261/28, 37, 76, 77, 123, DIG. 75
  See application file for complete search history.

(56) References Cited

U.S. PATENT DOCUMENTS

| | | | | | |
|---|---|---|---|---|---|
| 1,730,453 | A | * | 10/1929 | Devon | F02M 63/00 48/189.4 |
| 2,645,463 | A | * | 7/1953 | Stearns | B01F 25/31 138/44 |
| 3,119,704 | A | * | 1/1964 | Harrell | B28C 5/381 366/604 |
| 3,657,087 | A | * | 4/1972 | Scott | B01D 53/485 423/242.1 |
| 3,761,066 | A | * | 9/1973 | Wheeler | B01F 25/45 261/78.2 |
| 3,928,199 | A | * | 12/1975 | Kirk | C02F 3/26 210/150 |
| 3,965,975 | A | * | 6/1976 | Edmundson | B01F 35/55 165/108 |

(Continued)

*Primary Examiner* — Charles S Bushey
(74) *Attorney, Agent, or Firm* — Squire Patent Consulting & IP Law LLC; Brendan E. Squire

(57) ABSTRACT

A system, method, and apparatus for oxygenation of a source of water, to increase the dissolved oxygen content of water. Aspects of the present invention harnesses and directs the power of water flowing through the system to extract oxygen present in air, rather than relying on the injection of gas or using other mechanical means. The water oxygenator is formed as an elongate cylindrical tube having a water inlet at a first end, a water outlet at a second end, and an air inlet proximal to the first end. The elongate cylindrical tube has an outer sidewall defining a mixing chamber within an interior cavity of the water oxygenator. The mixing chamber includes a plurality of baffles that are disposed in a spaced apart relation along a longitudinal length of the interior cavity.

13 Claims, 4 Drawing Sheets

(56) References Cited

U.S. PATENT DOCUMENTS

| | | | | |
|---|---|---|---|---|
| 4,099,268 A * | 7/1978 | Luthi | ............... | B01F 25/431 |
| | | | | 366/338 |
| 4,214,982 A * | 7/1980 | Pfalzer | ............... | B03D 1/085 |
| | | | | 261/DIG. 75 |
| 4,441,823 A * | 4/1984 | Power | ............... | B01F 25/4521 |
| | | | | 366/181.5 |
| 4,859,376 A * | 8/1989 | Hancock | ............... | B01F 25/21 |
| | | | | 261/DIG. 7 |
| 4,880,447 A * | 11/1989 | Bloch | ............... | B01F 23/12 |
| | | | | 96/311 |
| 5,124,035 A * | 6/1992 | Dunne | ............... | B01F 25/43141 |
| | | | | 210/207 |
| 5,866,910 A * | 2/1999 | Cooke | ............... | B01J 19/122 |
| | | | | 250/436 |
| 5,888,403 A * | 3/1999 | Hayashi | ............... | B01F 25/4316 |
| | | | | 210/201 |
| 6,746,146 B1 * | 6/2004 | Thomas | ............... | B01F 35/91 |
| | | | | 366/167.1 |
| 8,079,751 B2 * | 12/2011 | Kapila | ............... | B01F 23/451 |
| | | | | 366/337 |
| 8,141,353 B2 * | 3/2012 | Zheng | ............... | B01F 25/3131 |
| | | | | 60/770 |
| 9,592,481 B2 * | 3/2017 | Oohara | ............... | F23D 14/62 |
| 11,224,845 B2 * | 1/2022 | White | ............... | B01F 25/4316 |
| 2006/0075745 A1 * | 4/2006 | Cummings | ............... | F01N 3/36 |
| | | | | 60/289 |
| 2009/0073800 A1 * | 3/2009 | Tarmann | ............... | B01F 33/81 |
| | | | | 366/173.1 |
| 2016/0158589 A1 * | 6/2016 | Pulz | ............... | A62D 1/0071 |
| | | | | 261/123 |
| 2019/0242227 A1 * | 8/2019 | Serate | ............... | B01F 25/431 |

* cited by examiner

SYSTEM, METHOD, AND APPARATUS TO OXYGENATE WATER

CROSS-REFERENCE TO RELATED APPLICATION

This application is a continuation of U.S. patent application Ser. No. 17/247,578, filed Dec. 17, 2020, now U.S. Pat. No. 11,224,845, and claims the benefit of priority to U.S. provisional application No. 62/965,335, filed Jan. 24, 2020, the contents of which are herein incorporated by reference.

BACKGROUND OF THE INVENTION

The present invention relates to water oxygenation, and more particularly to oxygenation of water sources in a retention reservoir for discharge to a waterway.

Water retention reservoirs are employed for many industrial processes to contain water used in the industrial process for subsequent treatment before the contained water is discharged into a waterway. Oxygenation of the contained water is a common treatment that is required for protection of the environment.

Discharge of improperly oxygenated water into a waterway is deleterious to the environment. States and other jurisdictions may specify a minimum oxygen content for water discharged into a waterway within the jurisdiction. Failure to meet a specified oxygen content can result in significant fines and interruption of plant operation.

Currently available oxygenation technologies include mechanical drivers, agitators, fountains, and bottom diffusion aerators. These oxygenation technologies can be expensive and often require extended temporal periods to properly elevate the dissolved oxygen level to a level that is suitable for discharge into a waterway.

As can be seen, there is a need for an improved system, method, and apparatus for oxygenating water of a retention reservoir for discharge into a waterway at high volumes.

SUMMARY OF THE INVENTION

In one aspect of the present invention, a water oxygenator is disclosed. The water oxygenator includes an elongate cylindrical tube having a first end, a second end, an outer sidewall defining a main mixing chamber within an interior cavity of the elongate cylindrical tube. A plurality of baffles is disposed in a spaced apart relation along a longitudinal length of the main mixing chamber. A water inlet is provided at the first end. The water inlet is adapted to be coupled to a source of water contained in a retention reservoir. The water inlet has a diameter less than a diameter of the elongate cylindrical tube. A water outlet is provided at the second end and has a diameter less than diameter of the elongate cylindrical tube. A first frusto-conical sidewall connects the water inlet with the outer sidewall. The frusto-conical sidewall defines an initial mixing chamber. An air inlet tube protrudes through the first frusto-conical sidewall into the initial mixing chamber. The air inlet tube is adapted to be coupled to a high-volume, low-pressure air source.

In some embodiments, each of the plurality of baffles further include a rectangular plate. An arcuate edge surface is defined along first opposed ends of the rectangular plate. A generally linear side edge is defined along second opposed ends of the plate. Each of the plurality of baffles are attached to an interior sidewall of the elongate cylindrical tube at the arcuate edge surface. Each of the plurality of baffles may be radially offset from each other along a longitudinal length of the main mixing chamber.

In some embodiments, the air inlet tube further includes an injector defined at a distal end of the air inlet tube. The injector is oriented to project in a downstream direction along a longitudinal centerline of the initial mixing chamber. An upstream side of the injector and the air inlet tube are oriented to obstruct a water flow from the source of water to introduce a turbulent zone at an exit of the injector within the initial mixing chamber.

In other embodiments, a second frusto-conical sidewall connects the outer sidewall with the water outlet.

In another aspect of the invention, a system for oxygenating a source of water held within a containment reservoir is disclosed. The system includes a water oxygenator formed as an elongate cylindrical tube having a first end, a second end, an outer sidewall defining a main mixing chamber within an interior cavity. A water inlet is provided at the first end. A fluid outlet is provided at the second end and configured to discharge a flow of oxygenated water from the water oxygenator. A plurality of baffles is contained within the interior cavity and are disposed in a spaced apart radially offset relation along a longitudinal length of the elongate cylindrical tube. A first frusto-conical sidewall connects the water inlet with the elongate cylindrical tube and defines an initial mixing chamber therein. An air inlet tube projects through the first frusto-conical sidewall into the initial mixing chamber. A water pump configured to communicate the source of water from the containment reservoir to the water inlet. An air source is configured to deliver high volume, low pressure air flow to the air inlet tube.

In some embodiments, each of the plurality of baffles include a rectangular plate. An arcuate edge surface is defined along first opposed ends of the rectangular plate. A generally linear side edge is defined along second opposed ends of the rectangular plate.

In some embodiments, each of the plurality of baffles are attached to an interior sidewall of the elongate cylindrical tube at the arcuate edge surface. An injector is defined at a distal end of the air inlet tube. The injector is oriented to project in a downstream direction along a longitudinal centerline of the initial mixing chamber.

In other embodiments, an upstream side of the injector and the air inlet tube are oriented to obstruct a water flow from the source of water to introduce a turbulent zone at an exit of the injector within the initial mixing chamber.

In other embodiments, a second frusto-conical sidewall connects the outer sidewall with the fluid outlet.

These and other features, aspects and advantages of the present invention will become better understood with reference to the following drawings, description and claims.

DETAILED DESCRIPTION

The following detailed description is of the best currently contemplated modes of carrying out exemplary embodiments of the invention. The description is not to be taken in a limiting sense but is made merely for the purpose of illustrating the general principles of the invention.

Figure 1:
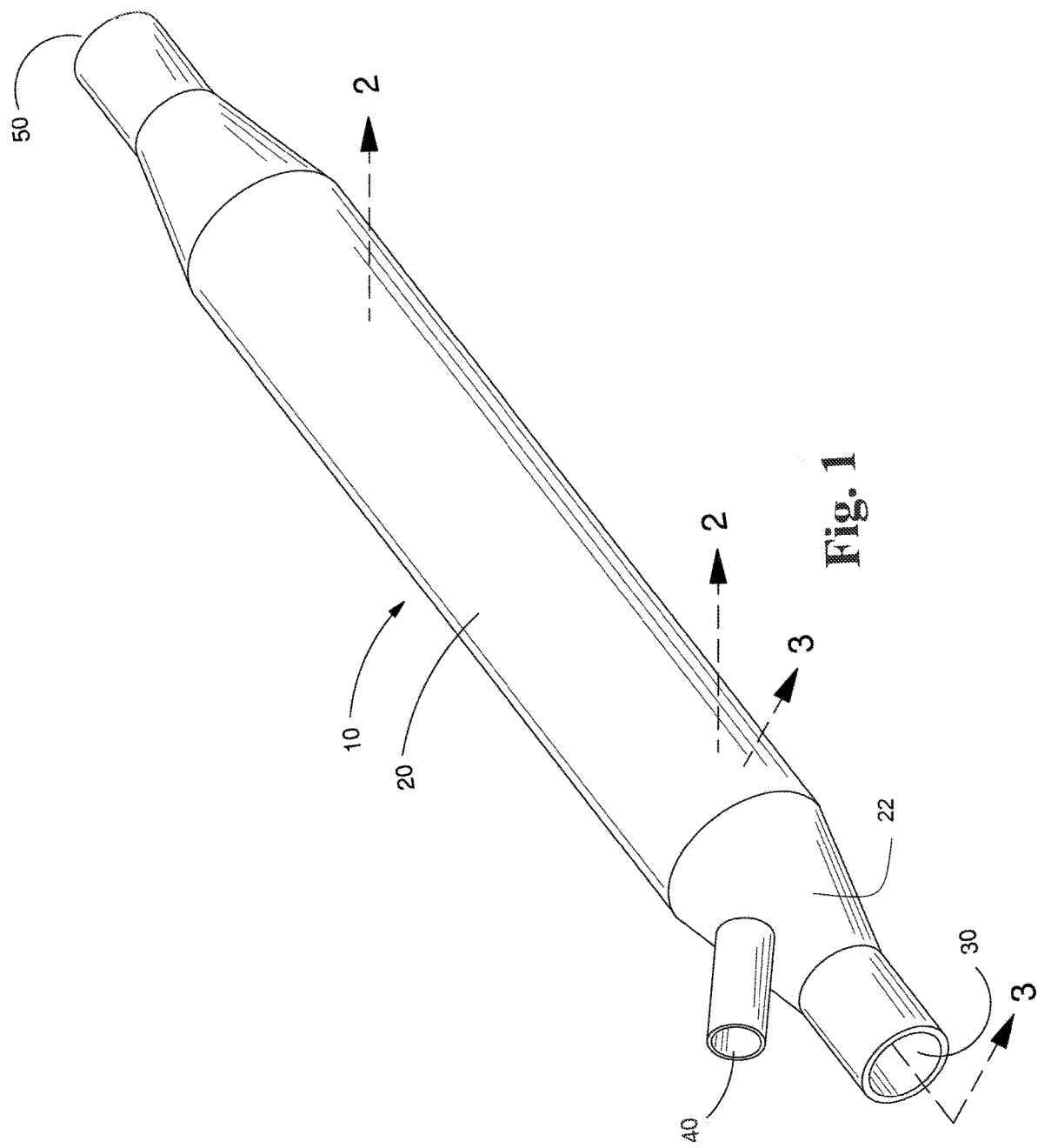
FIG. 1 is a front perspective view of a water oxygenator.
Figure 2:
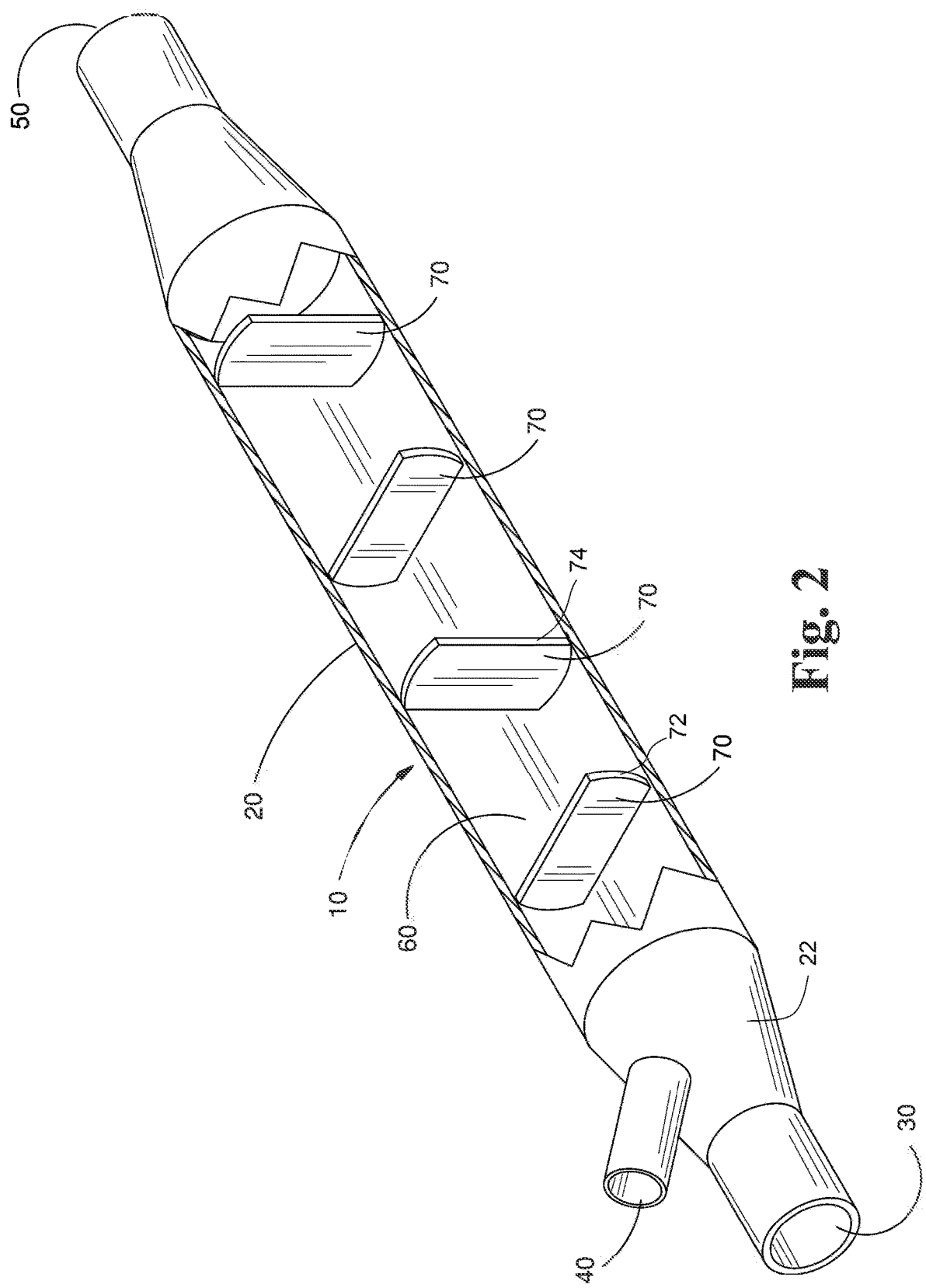
FIG. 2 is a partial cutaway view of the water oxygenator taken along lines 2-2 of FIG. 1.
Figure 3:
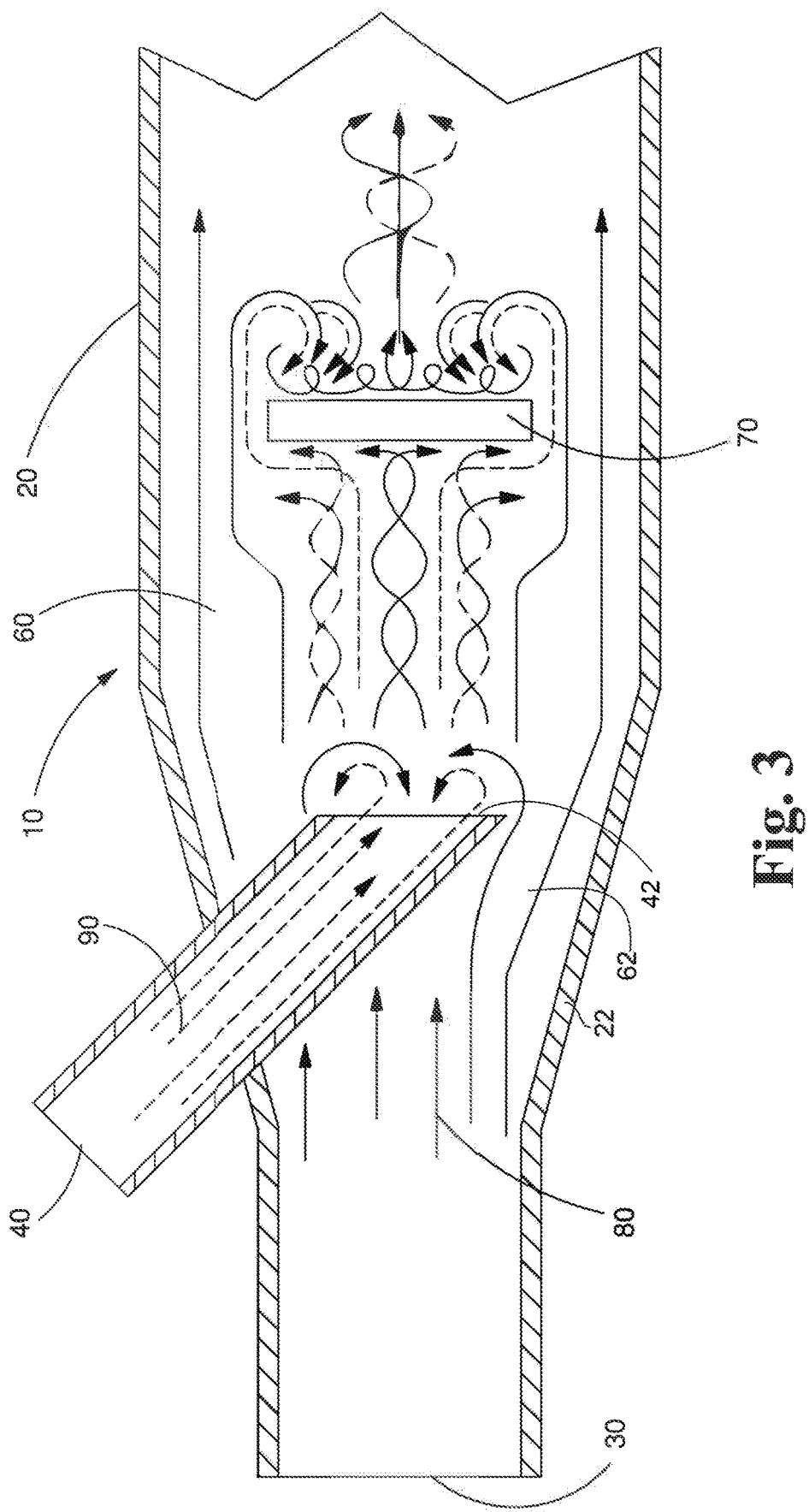
FIG. 3 is a detail cross sectional view of an inlet end of the water oxygenator taken along line 3-3 of FIG. 1.

As seen in reference to the drawings of FIGS. 1-3, a water oxygenator 10 of a water oxygenation system is illustrated. The water oxygenator 10, shown is a water-driven device, in the sense that its operation is only dependent on a flow of water through 100 the water oxygenator 10 and a flow of an oxygen containing gas 120 through an inlet 40 into the water oxygenator 10.

The water oxygenator 10 is formed as an elongate cylindrical tube having a water inlet 30 at a first end, a water outlet 50 at a second end, and an air inlet tube 40 proximal to the first end. The elongate cylindrical tube has an outer sidewall 20 defining a mixing chamber 60 within an interior cavity of the water oxygenator 10. The mixing chamber 60 includes a plurality of baffles 70 that are disposed in a spaced apart relation along a longitudinal length of the interior cavity.

Each of the water inlet 30 and the water outlet 50 may include a frusto-conical tapered sidewall 22 connecting to the outer sidewall 20 of the water oxygenator. In the case of the water inlet 40, the tapered sidewall 22 is formed by diverging sidewalls from the water inlet 40 to the outer sidewall 20. In the case of the water outlet 50, the tapered sidewall 24 is formed by converging sidewalls between the outer sidewall 20 and the water outlet 50.

Attached proximal to the water inlet 30 is a smaller air inlet tube 40 that provides an inlet portal for a high-volume, low-pressure air source (generally provided by a turbine 120). This air-inlet 40 connects to an initial mixing chamber 62 in communication with the mixing chamber 60 of the interior cavity of the water oxygenator 10. The air inlet tube 40 protrudes through the frusto-conical sidewall 62 and extends into a longitudinal centerline of the initial mixing chamber 62, terminating in an injector 42 at a distal end of the air inlet tube 40. The injector 42 is dimensioned to open towards the mixing chamber 60 with a downstream orientation. The injector 42 is angled generally perpendicular to a water flow 80 carried through the water inlet 30. An upstream side of the injector 42 and the air inlet tube 40 are oriented to obstruct the incoming water flow 80 to introduce a turbulent zone at the exit of the injector 42 into the interior cavity.

Each of the plurality of baffles 70 are formed as a generally rectangular plate having arcuate ends 72 to mate and join with an interior sidewall of the mixing chamber 60. Fluid flow through the mixing chamber 60 is provided between a side edge 74 of each of the plurality of baffles 70 offset from the arcuate ends and the interior sidewall of the mixing chamber 60. In the case of a metallic structure, the arcuate ends 72 of the baffles 70 may be welded to the mixing chamber 60. The orientation of each of the plurality of baffles 70 are disposed in a radially offset relationship, preferably at 90 degree angles, leaving a space between each side edge 74 and the interior sidewall of the mixing chamber 60.

Figure 4:
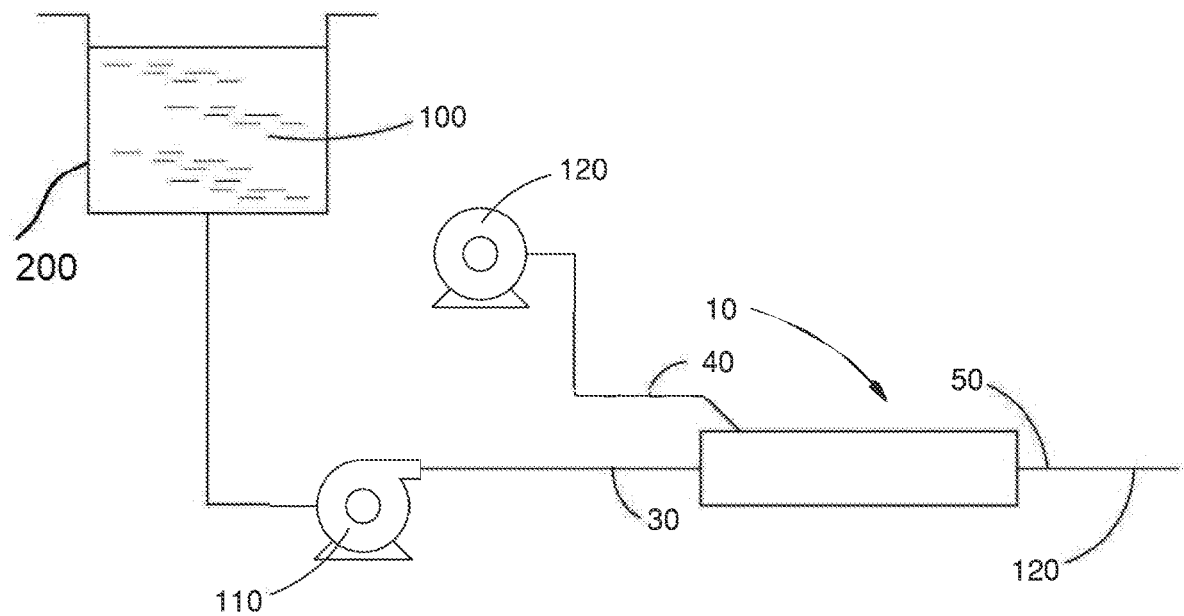
FIG. 4 is a schematic view of a water oxygenation system.

Operation of the water oxygenator 10 may be seen in reference to FIGS. 3 and 4, which harnesses the power of a water flow 80 through the water oxygenator 10 to mix with and to extract oxygen present in the air source 90. The water flow 80 and the air flow 90 mix in a plurality of turbulence zones defined throughout the water oxygenator 10. An initial turbulence zone is present at the juncture of the water 80 and the air flow 90 from the water inlet tube 40, and each of the plurality of baffles 70 within the mixing chamber 60. The plurality of turbulence zones increases the dissolved oxygen content of the water flow 80 for discharge in an environmentally compliant condition.

Figure 5:
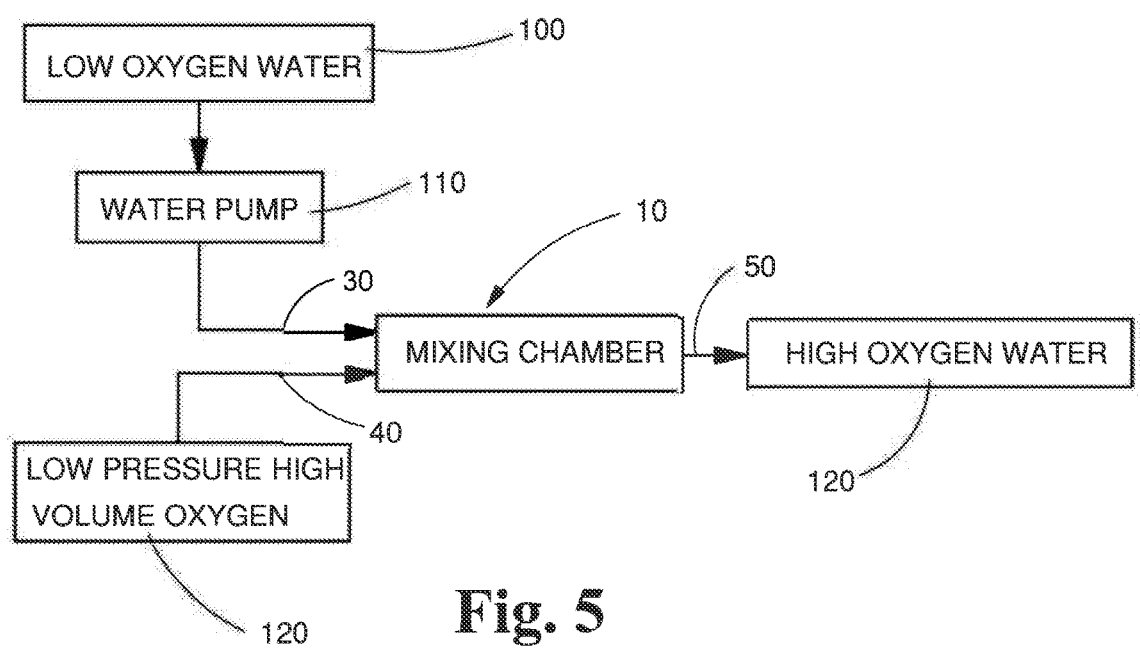
FIG. 5 is a flowchart of a water oxygenation process.

A process of oxygenating a water source retained in a containment reservoir according to other aspects of the present is shown in reference to FIG. 5 and includes the following:

1) Water 100 from a containment reservoir is delivered via a pump 110 to enters the water inlet 30 of the water oxygenator 10 through the water inlet 30.
2) An air source 120, such as a turbine, generates a steady, high volume of the air flow 90 at a low pressure, is operatively connected to enter through the air inlet tube 40.
3) The water 80 and air 90 come together in the first mixing chamber 62, creating the initial turbulence zone. As the water 80 flows into the elongate tube of the mixing chamber 60 it begins to mix with oxygen carried in the air source 90.
4) The force of the water flow 80 at a point of impact with each of the plurality of baffles 70 generates a pressure and additional turbulence which forces the water 80 to flow around the side edges 74 of the baffle 70. Turbulence at the back side of the baffle 70 creates a low-pressure void for oxygenation of the water.

The above-described process is repeated with each additional baffle 70. With the angular offset between a preceding and a subsequent baffle 70, turbulent flow is induced, with associated changes in pressure as the water 80 and air 90 flow through the water oxygenator 10 and around the offset baffles 70 which results in a thorough mixing of the air 90 and the water 80, resulting in an immediate and significant increase in the dissolved oxygen content of the water discharged from the outlet 50.

The basic structure of the water oxygenator 10 may remain the same but the water oxygenator 10 may be made of alternative materials, such as aluminum or steel, depending on the intended application and flow volumes. Advantages of the system include: 1. Low construction cost; 2. Ease of use; 3. Scalability; 4. Low energy consumption; 5. Minimal moving parts; 6. Simplicity (only water and air required); 7. Wide application; and 8. High output.

The system according to aspects of the present invention is illustrated in reference to FIG. 4. The system may include a water containment reservoir 200, containing a volume of water 100 having a lowered oxygen content. A water pump 110 communicates the water 100 from the containment reservoir 200 to the water inlet 30 of the water oxygenator 10. A low pressure, high volume air source 120, which may be provided by a turbine or the like, supplies air 90 to the air inlet tube 40 of the water oxygenator 10. After passage through the water oxygenator 10, high oxygen content water is discharged from the outlet 50 in an environmentally compliant condition.

As seen in reference to Table 1, the water oxygenator and oxygenation system is effective in significantly elevating the dissolved oxygen content of the water in the retention reservoir for discharge into a waterway.

| Units | Retention Reservoir Water Conditions | Discharge Water Dissolved Oxygen After Treatment |
|---|---|---|
| Dissolved Oxygen (ppm) | 0.14 | 7.05 |
| pH | 7.1 | — |
| Temperature (° C.) | 24.6 | — |

-continued

| Units | Retention Reservoir Water Conditions | Discharge Water Dissolved Oxygen After Treatment |
|---|---|---|
| Dissolved Oxygen (ppm) | 0.27 | 7.31 |
| pH | 7.1 | — |
| Temperature (° C.) | 24.7 | — |
| Dissolved Oxygen (ppm) | 0.31 | 7.30 |
| pH | 7.1 | — |
| Temperature (° C.) | 24.3 | — |

The foregoing results were obtained with a water oxygenator 10 having a water inlet 30 of 3 inches, a diameter of 5 inches along the sidewall 60, and a water outlet diameter of 3 inches. The water flow 80 through the water oxygenator was maintained at a nominal flow of 100 gallons per minute. The air flow 90 through the water oxygenator 10 was maintained at a nominal flow of 50 SCFM at a pressure of 4 psi.

It should be understood, of course, that the foregoing relates to exemplary embodiments of the invention and that modifications may be made without departing from the spirit and scope of the invention as set forth in the following claims.

What is claimed is:

1. A water oxygenator, comprising:
    an elongate cylindrical tube having a first end, a second end, an outer sidewall defining a main mixing chamber within an interior cavity of the elongate cylindrical tube;
    a plurality of baffles disposed in a spaced apart relation along a longitudinal length of the main mixing chamber;
    a water inlet at the first end, the water inlet coupled with a source of oxygen depleted water contained in a retention reservoir, the water inlet having a diameter less than a diameter of the elongate cylindrical tube;
    a water outlet at the second end, having a diameter less than the diameter of the elongate cylindrical tube;
    a first frusto-conical sidewall connecting the water inlet with the outer sidewall, the frusto-conical sidewall defining an initial mixing chamber; and
    an air inlet tube protruding through the first frusto-conical sidewall into the initial mixing chamber defined within the frusto-conical sidewall, the air inlet tube coupled with a high-volume, low-pressure air source to oxygenate the oxygen depleted water contained in the retention reservoir.

2. The water oxygenator of claim 1, wherein each of the plurality of baffles further comprises:
    a rectangular plate;
    an arcuate edge surface defined along first opposed ends of the rectangular plate; and
    a generally linear side edge defined along second opposed ends of the plate.

3. The water oxygenator of claim 2, wherein each of the plurality of baffles are attached to an interior sidewall of the elongate cylindrical tube at the arcuate edge surface.

4. The water oxygenator of claim 3, wherein each of the plurality of baffles are radially offset from each other along a longitudinal length of the main mixing chamber.

5. The water oxygenator of claim 1, the air inlet tube further comprising:
    an injector defined at a distal end of the air inlet tube, the injector oriented to project in a downstream direction along a longitudinal centerline of the initial mixing chamber.

6. The water oxygenator of claim 5, wherein an upstream side of the injector and the air inlet tube are oriented to obstruct a water flow from the source of water to introduce a turbulent zone at an exit of the injector within the initial mixing chamber.

7. The water oxygenator of claim 1, further comprising:
    a second frusto-conical sidewall connecting the outer sidewall with the water outlet.

8. A method for oxygenating a source of water held within a containment reservoir, comprising:
    providing a water oxygenator formed as an elongate cylindrical tube having a first end, a second end, an outer sidewall defining a main mixing chamber within an interior cavity, a water inlet at the first end, a fluid outlet at the second end configured to discharge a flow of oxygenated water from the water oxygenator, a plurality of baffles within the interior cavity disposed in a spaced apart radially offset relation along a longitudinal length of the elongate cylindrical tube, a first frusto-conical sidewall connecting the water inlet with the elongate cylindrical tube defining an initial mixing chamber therein, and an air inlet tube projecting through the first frusto-conical sidewall into the initial mixing chamber;
    delivering a volume of oxygen depleted water from the containment reservoir to the water inlet;
    injecting a high volume, low pressure air flow to the air inlet tube to oxygenate the source of water carried through the water oxygenator; and
    discharging a volume of oxygenated water from the water from the water oxygenator into a waterway.

9. The method claim 8, wherein each of the plurality of baffles further comprises:
    a rectangular plate;
    an arcuate edge surface defined along first opposed ends of the rectangular plate; and
    a generally linear side edge defined along second opposed ends of the rectangular plate.

10. The method of claim 9, wherein each of the plurality of baffles are attached to an interior sidewall of the elongate cylindrical tube at the arcuate edge surface.

11. The method of claim 8, the air inlet tube further comprising:
    orienting an injector defined at a distal end of the air inlet tube to project in a downstream direction along a longitudinal centerline of the initial mixing chamber.

12. The method of claim 11, further comprising:
    orienting an upstream side of the injector and the air inlet tube to obstruct a water flow from the source of water to introduce a turbulent zone at an exit of the injector within the initial mixing chamber.

13. The method of claim 8, further comprising:
    a second frusto-conical sidewall connecting the outer sidewall with the fluid outlet.

\* \* \* \* \*